(12) United States Patent
Wang et al.

(10) Patent No.: US 8,625,188 B2
(45) Date of Patent: *Jan. 7, 2014

(54) PROCESS FOR THE MANUFACTURE OF ELECTROPHORETIC DISPLAYS

(75) Inventors: Xiaojia Wang, Fremont, CA (US); Rong-Chang Liang, Cupertino, CA (US); Gary Yih-Ming Kang, Fremont, CA (US)

(73) Assignee: SiPix Imaging, Inc., Fremont, CA (US)

( * ) Notice: Subject to any disclaimer, the term of this patent is extended or adjusted under 35 U.S.C. 154(b) by 917 days.

This patent is subject to a terminal disclaimer.

(21) Appl. No.: 12/716,107

(22) Filed: Mar. 2, 2010
(Under 37 CFR 1.47)

(65) Prior Publication Data

US 2010/0288639 A1    Nov. 18, 2010

Related U.S. Application Data

(63) Continuation-in-part of application No. 12/051,614, filed on Mar. 19, 2008, now Pat. No. 7,684,108, which is a continuation of application No. 11/125,573, filed on May 9, 2005, now Pat. No. 7,374,634, which is a continuation-in-part of application No. 10/845,295, filed on May 12, 2004, now Pat. No. 7,052,571.

(60) Provisional application No. 60/570,845, filed on May 12, 2004.

(51) Int. Cl.
*G02B 26/00* (2006.01)
*B32B 38/14* (2006.01)

(52) U.S. Cl.
USPC .......................................... 359/296; 156/277

(58) Field of Classification Search
USPC ................. 359/296; 345/107; 430/32, 34, 38; 204/600, 450; 156/277, 292
See application file for complete search history.

(56) References Cited

U.S. PATENT DOCUMENTS

| 3,612,758 | A | 10/1971 | Evans |
| 3,668,106 | A | 6/1972 | Ota |
| 4,071,430 | A | 1/1978 | Liebert |
| 4,093,534 | A | 6/1978 | Carter et al. |
| 4,285,801 | A | 8/1981 | Chiang |
| 4,680,103 | A | 7/1987 | Beilin et al. |
| 5,380,362 | A | 1/1995 | Schubert |

(Continued)

FOREIGN PATENT DOCUMENTS

| JP | 2003-167275 | 6/2003 |
| WO | WO 2005/114335 | 12/2005 |

OTHER PUBLICATIONS

Allen, K. (Oct. 2003). Electrophoretics Fulfilled. *Emerging Displays Review: Emerging Display Technologies, Monthly Report*—Oct. 2003, 9-14.

(Continued)

*Primary Examiner* — Tuyen Tra
(74) *Attorney, Agent, or Firm* — Perkins Coie LLP

(57) ABSTRACT

This invention relates to a process for the manufacture of a multi-color electrophoretic display involving adding colorant solutions or dispersions of different colors and charged pigment particles in separate steps. The process comprises a first step of pattern-wise filling colorant solutions or dispersions into microcups in predetermined areas, followed by a step of pattern-wise or non-pattern-wise adding an electrophoretic fluid comprising charged pigment particles dispersed in a dielectric solvent or solvent mixture into the microcups which are pre-filled with the colorants.

16 Claims, 4 Drawing Sheets

(56) References Cited

U.S. PATENT DOCUMENTS

| | | | |
|---|---|---|---|
| 5,403,518 | A | 4/1995 | Schubert |
| 5,573,711 | A | 11/1996 | Hou et al. |
| 5,914,806 | A | 6/1999 | Gordon, II et al. |
| 5,930,026 | A | 7/1999 | Jacobson et al. |
| 5,961,804 | A | 10/1999 | Jacobson et al. |
| 6,017,584 | A | 1/2000 | Albert et al. |
| 6,400,492 | B1 | 6/2002 | Morita et al. |
| 6,525,865 | B2 | 2/2003 | Katase |
| 6,545,797 | B2 | 4/2003 | Chen et al. |
| 6,721,084 | B2 | 4/2004 | Kawai |
| 6,741,386 | B2 | 5/2004 | Minami |
| 6,788,449 | B2 | 9/2004 | Liang et al. |
| 6,885,495 | B2 | 4/2005 | Liang et al. |
| 6,930,818 | B1 | 8/2005 | Liang et al. |
| 6,933,098 | B2 | 8/2005 | Chan-Park et al. |
| 6,972,893 | B2 | 12/2005 | Chen et al. |
| 7,042,626 | B2 | 5/2006 | Katase |
| 7,046,228 | B2 | 5/2006 | Liang et al. |
| 7,052,571 | B2 | 5/2006 | Wang et al. |
| 7,052,766 | B2 | 5/2006 | Chen et al. |
| 7,079,303 | B2 | 7/2006 | Hou et al. |
| 7,110,162 | B2 | 9/2006 | Chen et al. |
| 7,112,114 | B2 | 9/2006 | Liang et al. |
| 7,141,688 | B2 | 11/2006 | Feng et al. |
| 7,226,550 | B2 | 6/2007 | Hou et al. |
| 7,277,218 | B2 | 10/2007 | Hwang et al. |
| 7,286,279 | B2 | 10/2007 | Yu et al. |
| 7,374,634 | B2 | 5/2008 | Wang et al. |
| 7,390,901 | B2 | 6/2008 | Yang et al. |
| 7,572,394 | B2 | 8/2009 | Gu et al. |
| 7,684,108 | B2 | 3/2010 | Wang et al. |
| 2002/0018043 | A1 | 2/2002 | Nakanishi |
| 2002/0166771 | A1 | 11/2002 | Kanbe |
| 2004/0030125 | A1 | 2/2004 | Li et al. |
| 2004/0246298 | A1 | 12/2004 | Ito et al. |
| 2004/0257330 | A1 | 12/2004 | Minami |
| 2005/0039274 | A1 | 2/2005 | Yang et al. |
| 2005/0136347 | A1 | 6/2005 | Gu et al. |
| 2007/0126695 | A1 | 6/2007 | Kishi |

OTHER PUBLICATIONS

Bardsley, J.N. & Pinnel, M.R. (Nov. 2004) Microcup™ Electrophoretic Displays. *USDC Flexible Display Report*, 3.1.2. pp. 3-12-3-16.

Chaug, Y.S., Haubrich, J.E., Sereda, M. and Liang, R.C. (Apr. 2004). Roll-to-Roll Processes for the Manufacturing of Patterned Conductive Electrodes on Flexible Substrates. *Mat. Res. Soc. Symp. Proc.*, vol. 814, 19.6.1.

Chen, S.M. (Jul. 2003) The Applications for the Revolutionary Electronic Paper Technology. *OPTO News & Letters*, 102, 37-41. (in Chinese, English abstract attached, full translation available upon request).

Chen, S.M. (May 2003) The New Applications and the Dynamics of Companies. *TRI.* 1-10. (in Chinese, English abstract attached).

Chung, J., Hou, J., Wang, W., Chu, L.Y., Yao, W., & Liang, R.C. (Dec. 2003). Microcup(R) Electrophoretic Displays, Grayscale and Color Rendition. *IDW*, AMD2/EP1-2, 243-246.

Dalisa, A. L., "Electrophoretic Display Technology", IEEE Trans. Electron Devices, pp. 827-834 (1977).

Ho, Andrew. (Nov. 2006) *Embedding e-Paper in Smart Cards, Pricing Labels & Indicators*. Presentation conducted at Smart Paper Conference Nov. 15-16, 2006, Atlanta, GA, USA.

Ho, C.,& Liang, R.C. (Dec. 2003). *Microcup (R) Electronic Paper by Roll-to-Roll Manufacturing Processes*. Presentation conducted at FEG, Nei-Li, Taiwan.

Ho, Candice. (Feb. 1, 2005) *Microcupt® Electronic Paper Device and Applicaiton*. Presentation conducted a USDC 4th Annual Flexible Display Conference 2005.

Hopper, M. A. et al, "An Electrophoretic Display, its Properties, Model and Addressing", IEEE Transactions on Electron Devices, 26(8): 1148-1152 (1979).

Hou, J., Chen, Y., Li, Y., Weng, X., Li, H. and Pereira, C. (May 2004). Reliability and Performance of Flexible Displays by Roll-to-Roll Manufacturing Processes. *SID Digest*, 32.3, 1066-1069.

Kao, WC., (Feb. 2009) Configurable Timing Controller Design for Active Matrix Electrophoretic Display. *IEEE Transactions on Consumer Electronics*, 2009, vol. 55, Issue 1, pp. 1-5.

Kao, WC., Fang, CY., Chen, YY., Shen, MH., and Wong, J. (Jan. 2008) Integrating Flexible Electrophoretic Display And One-Time Password Generator in Smart Cards. *ICCE 2008 Digest of Technical Papers*, P4-3. (Int'l Conference on Consumer Electronics Jan. 9-13, 2008).

Kao, WC., Ye, JA., and Lin, C. (Jan. 2009) Image Quality Improvement for Electrophoretic Displays by Combining Contrast Enhancement and Halftoning Techniques. *ICCE 2009 Digest of Technical Papers*, 11.2-2.

Kao, WC., Ye, JA., Chu, MI., and Su, CY. (Feb. 2009) Image Quality Improvement for Electrophoretic Displays by Combining Contrast Enhancement and Halftoning Techniques. *IEEE Transactions on Consumer Electronics*, 2009, vol. 55, Issue 1, pp. 15-19.

Kao, WC., Ye, JA., Lin, FS., Lin, C., and Sprague, R. (Jan. 2009) Configurable Timing Controller Design for Active Matrix Electrophoretic Display with 16 Gray Levels. *ICCE 2009 Digest of Technical Papers*, 10.2-2.

Lee, H., & Liang, R.C. (Jun. 2003) SiPix Microcup(R) Electronic Paper—An Introduction. *Advanced Display*, Issue 37, 4-9 (in Chinese, English abstract attached).

Liang, R.C. (Feb. 2003) *Microcup(R) Electrophoretic and Liquid Crystal Displays by Roll-to-Roll Manufacturing Processes*. Presentation conducted at the Flexible Microelectronics & Displays Conference of U.S. Display Consortium, Phoenix, Arizona, USA.

Liang, R.C. (Apr. 2004). *Microcup Electronic Paper by Roll-to-Roll Manufacturing Process*. Presentation at the Flexible Displays & Electronics 2004 of Intertech, San Fransisco, California, USA.

Liang, R.C. (Oct. 2004) *Flexible and Roll-able Display/Electronic Paper—A Technology Overview*. Paper presented at the METS 2004 Conference in Taipie, Taiwan.

Liang, R.C., & Tseng, S. (Feb. 2003). *Microcup(R) LCD, An New Type of Dispersed LCD by a Roll-to-Roll Manufacturing Process*. Paper presented at the IDMC, Taipei, Taiwan.

Liang, R.C., (Feb. 2005) *Flexible and Roll-able Displays/Electronic Paper—A Brief Technology Overview*. Flexible Display Forum, 2005, Taiwan.

Liang, R.C., Hou, J., & Zang, H.M. (Dec. 2002) Microcup Electrophoretic Displays by Roll-to-Roll Manufacturing Processes. *IDW*, EP2-2, 1337-1340.

Liang, R.C., Hou, J., Chung, J., Wang, X., Pereira, C., & Chen, Y. (2003). Microcup(R) Active and Passive Matrix Electrophoretic Displays by a Roll-to-Roll Manufacturing Processes. *SID Digest*, 20.1.

Liang, R.C., Hou, J., Zang, H.M., & Chung, J. (Feb. 2003). *Passive Matrix Microcup(R) Electrophoretic Displays*. Paper presented at the IDMC, Taipei, Taiwan.

Liang, R.C., Hou, J., Zhang, H.M., Chung, J., & Tseng, S. (2003). Microcup(R) displays : Electronics Paper by Roll-to-Roll Manufacturing Processes. *Journal of the SID*, 11(4), 621-628.

Liang, R.C., Zang, H.M., Wang, X., Chung, J. & Lee, H., (Jun./Jul. 2004) >>Format Flexible Microcup (R) Electronic Paper by Roll-to-Roll Manufacturing Process <<, Presentation conducted at the 14th FPD Manufacturing Technology EXPO & Conference.

Murau and Singer, "The Understanding and Elimination of Some Suspension Instabilities in an Electrophoretic Displa"., J. Appl. Phys. 49(9), pp. 4820-4829, 1978.

Nikkei Microdevices. (Dec. 2002) Newly-Developed Color Electronic Paper Promises—Unbeatable Production Efficiency. *Nikkei Microdevices, 3.* (in Japanese, with English translation).

Sprague, R.A. (Sep. 23, 2009) SiPix Microcup Electrophoretic Epaper for Ebooks. *NIP 25*, 2009 pp. 460-462. (Presentation conducted on Sep. 23, 2009 at the 25th Int'l. Conference on Digital Printing Technologies, Digital Fabrication 2009 (NIP 25) by Society for Imaging Science and Technology, in Louisville, Kentucky, USA.).

(56) References Cited

OTHER PUBLICATIONS

Wang, X., Kiluk, S., Chang, C., & Liang, R.C. (Feb. 2004). Mirocup (R) Electronic Paper and the Converting Processes. *ASID*, 10.1.2-26, 396-399, Nanjing, China.

Wang, X., Kiluk, S., Chang, C., & Liang, R.C., (Jun. 2004) Microcup® Electronic Paper and the Converting Processes. *Advanced Display*, Issue 43, 48-51.

Wang, X., Li, P., Sodhi, D., Xu, T. and Bruner, S. et al., (Feb. 2006) *Inkjet Fabrication of Multi-Color Microcup® Electrophorectic Display*. the Flexible Microelectronics & Displays Conference of U.S. Display Consortium.

Wang, X., Zang, HM., and Li, P. (Jun. 2006) Roll-to-Roll Manufacturing Process for Full Color Electrophoretic film. *SID Digest*, 00pp. 1587-1589.

Zang, H.M, Hwang, J.J., Gu, H., Hou, J., Weng, X., Chen, Y., et al. (Jan. 2004). Threshold and Grayscale Stability of Microcup (R) Electonic Paper. *Proceeding of SPIE—IS&T Electronic Imaging, SPIE* vol. 5289, 102-108.

Zang, H.M. (Oct. 2003). *Microcup (R) Electronic Paper by Roll-to-Roll Manufacturing Processes*. Presentation conducted at the Advisory Board Meeting, Bowling Green State University, Ohio, USA.

Zang, H.M. (Feb. 2004). *Microcup Electronic Paper*. Presentation conducted at the Displays & Microelectronics Conference of U.S. Display Consortium, Phoenix, Arizona, USA.

Zang, H.M., & Liang, R.C. (2003) Microcup Electronic Paper by Roll-to-Roll Manufacturing Processes. *The Spectrum*, 16(2), 16-21.

Zang, H.M.Hou, Jack, (Feb. 2005) *Flexible Microcup® EPD by RTR Process. Presentation conducted at $2^{nd}$* Annual Paper-Like Displays Conference, Feb. 9-11, 2005, St. Pete Beach, Florida.

Zang, HM., (Feb. 2007) *Developms in Microcup® Flexible Displays*. Presidentaiton conducted at the 6th Annual Flexible Display and Microelectronics Conference, Phoenix, AZ Feb. 6-8.

Zang, HM., (Sep. 2006) *Monochrome and Area Color Microcup®EPDs by Roll-to-Roll Manufacturing Process*. Presentation conducted at the Forth Organic Electronics Conference and Exhibition (OEC-06), Sep. 25-27, 2006, Frankfurt, Germany.

Zang, HM., Wang, F., Kang, Y.M., Chen, Y., and Lin, W. (Jul. 2007) Microcup® e-Paper for Embedded and Flexible Designs. IDMC'07, Taipei International Convention Center, Taiwan.

Zang, HM., Wang, W., Sun, C., Gu, H., and Chen, Y. (May 2006) Monochrome and Area Color Microcup® EPDs by Roll-to-Roll Manufacturing Processes. *ICIS '06 International Congress of Imaging Science Final Program and Proceedings*, pp. 362-365.

PROCESS FOR THE MANUFACTURE OF ELECTROPHORETIC DISPLAYS

This application is a continuation-in-part of U.S. application Ser. No. 12/051,614, filed Mar. 19, 2008 now U.S. Pat. No. 7,684,108; which is a continuation of U.S. application Ser. No. 11/125,573, filed May 9, 2005, now U.S. Pat. No. 7,374,634; which is a continuation-in-part of U.S. application Ser. No. 10/845,295, filed on May 12, 2004 now U.S. Pat. No. 7,052,571. U.S. application Ser. No. 11/125,573 also claims the priority under 35 USC 119(e) of U.S. Provisional Application No. 60/570,845, filed May 12, 2004. The contents of the above-identified applications are incorporated herein by reference in their entirety.

BACKGROUND OF THE INVENTION a) Field of the Invention

This invention relates to processes for the manufacture of electrophoretic displays, in particular, multi-color and sectional electrophoretic displays.

b) Description of Related Art

The electrophoretic display (EPD) is a non-emissive device based on the electrophoresis phenomenon of charged pigment particles suspended in a solvent. It was first proposed in 1969. The display usually comprises two plates with electrodes placed opposing each other, separated by spacers. One of the electrodes is usually transparent. An electrophoretic fluid composed of a dielectric solvent with charged pigment particles dispersed therein is enclosed between the two electrode plates. When a voltage difference is imposed between the two electrode plates, the pigment particles migrate to one side or the other causing either the color of the pigment particles or the color of the solvent being seen from the viewing side.

There are several different types of EPDs. In the partition type EPD (see M. A. Hopper and V. Novotny, *IEEE Trans. Electr. Dev.*, 26 (8):1148-1152 (1979)), there are partitions between the two electrode plates for dividing the space into smaller cells, in order to prevent undesired movement of particles, such as sedimentation. The microcapsule type EPD (as described in U.S. Pat. Nos. 5,961,804 and 5,930,026) has a substantially two dimensional arrangement of microcapsules each having therein an electrophoretic composition of a dielectric solvent and a suspension of charged pigment particles that visually contrast with the dielectric solvent. Another type of EPD (see U.S. Pat. No. 3,612,758) has electrophoretic cells that are formed from parallel line reservoirs. The channel-like electrophoretic cells are covered, and in electrical contact, with transparent conductors. A layer of transparent glass from which side the panel is viewed overlies the transparent conductors.

An improved EPD technology was disclosed in U.S. Pat. No. 6,930,818 (corresponding to WO 01/67170), the content of which is incorporated herein by reference in its entirety. The improved EPD cells are prepared by, for example, microembossing a layer of a thermoplastic or thermoset precursor composition coated on a first substrate to form microcups of well-defined shape, size and aspect ratio. The microcups are then filled with an electrophoretic fluid and top-sealed with a polymeric sealing layer. A second substrate is laminated over the filled and sealed microcups, preferably with an adhesive layer.

The microcup-based multi-color electrophoretic display has many advantages. For example, when the microcup dimensions are formed to match the size of the sub-pixels intended for the red, green and blue color on a thin film transistor backplane, they can be filled individually with the red, green and blue colored electrophoretic fluids to correspond to the geometric arrangements of the sub-pixels on the TFT backplane. This feature allows the possibility of true multi-color displays with active matrix driving. Examples of the driving schemes for the multi-color microcup-based electrophoretic displays are described in detail in U.S. Pat. No. 6,885,495 (corresponding to WO03/009059) and U.S. Pat. No. 7,046,228 (corresponding to WO03/016993), the contents of both of which are incorporated herein by reference in their entirety.

From the manufacture point of view, accurate placement of a minute amount of electrophoretic fluids into the designated microcups is theoretically achievable with current technologies. Inkjet printing has been considered as a possible candidate for this task because of its ability to precisely deliver a predetermined volume of a fluid in the form of tiny droplets of a well-controlled size. The tall partition walls of the microcup-based electrophoretic displays appear to also provide a good mechanism to prevent splash and mixing of inkjet-printed electrophoretic fluids. However, there are several very challenging processing issues to be solved before the roll-to-roll manufacturing of multi-color electrophoretic displays can be implemented.

First, the diameter of the charged pigment particles in the electrophoretic fluids is typically in the range of tenths of a micron to several microns. Plugging of the inkjet head nozzles could be a major reliability problem, particularly if the pigment particles have a tendency to flocculate or aggregate during use or storage.

In addition, when a dielectric solvent of low surface tension, such as a perfluorinated or hydrocarbon solvent, is used in the electrophoretic fluids, there are additional difficulties because of the low surface tension of the solvent. The preferred surface tension of conventional inkjet inks or fluids is typically in the range of 30~45 dyne/cm. The extremely low surface tension (in the range of 14~30 dyne/cm) of dielectric solvents, particularly the perfluorinated solvents, does present a major problem in the control of the droplet breakdown process. For example, when a perfluorinated solvent is used in an electrophoretic fluid, it is difficult to maintain a negative surface pressure to keep the electrophoretic fluid inside the nozzle. Furthermore, undesirable drying and particle deposition on the nozzle head would occur because of the capillary effect that encourages an outward material flow to the nozzle surface. Therefore, it has been very difficult to manufacture electrophoretic displays with high efficiency and reliability when inkjet printing is involved in the filling of the electrophoretic fluids, particularly when a dielectric solvent of low surface tension is used.

Also, in the roll-to-roll manufacturing process for microcup-based electrophoretic displays, the electrophoretic fluid filling process is immediately followed by a sealing process. When the microcups in one particular area on the web are filled with slightly more fluids than necessary, there is the possibility of "overflow" of the fluids in this area to the adjacent microcups before or during the subsequent sealing step. The "overflow" of an electrophoretic fluid of one color to adjacent microcups containing electrophoretic fluids of other colors means intermixing of different colors, which inevitably would result in reduction of the color purity of the display manufactured therefrom. Therefore, there has been a strong need for a roll-to-roll manufacturing process for multi-color electrophoretic displays with a wider process window to ensure product quality.

SUMMARY OF THE INVENTION

The first aspect of the present invention relates to a process for the manufacture of a multi-color electrophoretic display involving adding colorant solutions or dispersions of different colors and charged pigment particles in separate steps. More specifically, the process comprises a first step of pattern-wise filling colorant solutions or dispersions into microcups in predetermined areas, for example, by inkjet printing. The second step is the pattern-wise or non-pattern-wise adding an electrophoretic fluid comprising charged pigment (e.g., $TiO_2$ or other white or colored pigments) particles dispersed in a dielectric solvent or solvent mixture into the microcups which are pre-filled with the colorants.

The carrier solvent used in the colorant solutions or dispersions may be the same or different from the dielectric solvent or solvent mixture in the electrophoretic fluid. If the carrier solvent in the colorant solutions or dispersions is different from the dielectric solvent or solvent mixture, it would act only as a carrier for the colorants and is evaporated after having delivered the colorants to their designated locations.

The colorants in the microcups are re-dissolved or re-dispersed back into the electrophoretic fluid after the electrophoretic fluid is added in. The thus filled microcups are then top-sealed by one of the sealing processes as described in this and related applications.

The second aspect of the present invention relates to a process for the manufacture of an electrophoretic display comprising microcups filled with electrophoretic fluids of different electrophoretic characteristics, such as switching rate, threshold voltage, gamma and/or clearing voltage. The process comprises the steps of pattern-wise filling microcups by, for example, inkjet printing, with additive solutions or dispersions providing the various characteristics, followed by pattern-wise or non-pattern-wise adding an electrophoretic fluid comprising charged pigment (e.g., $TiO_2$ or other white or colored pigments) particles dispersed in a dielectric solvent or solvent mixture into the microcups which have been pre-filled with the additive solutions or dispersions. The thus filled microcups are then top-sealed by one of the sealing processes as described in this and related applications.

Useful additives for the present invention may include, but are not limited to, surfactants, protective colloids, polymers, viscosity modifiers, charge controlling agents, stabilizers, antioxidants, fluorescent materials, fillers and filler particles. Specific examples of useful additives may include, but are not limited to, those disclosed in U.S. Pat. Nos. 7,110,162; 7,052,766; 7,286,279; 7,226,550; 7,141,688; and 7,277,218; and U.S. Publication No. 2005-0136347; the contents of all of which are incorporated herein by reference in their entirety.

The processes of the first and second aspects of the invention as described above may also be suitable for the manufacture of sectional electrophoretic displays.

The processes of the present invention have many advantages. For example, the surface tension and rheology of the colorant or additive solutions or dispersions to be filled may be optimized independently from the electrophoretic fluid. This provides a much wider process window to find a suitable precision placement method. Secondly, if inkjet printing is used, the risk of plugging the inkjet nozzles by the pigment particles is significantly reduced. Thirdly, the processes are compatible with the roll-to-roll manufacturing process. The electrophoretic fluid used in the process may be universal to all microcups and it acts as a blanket on top of different colorants or additives pre-filled in the microcups. Therefore, slight overflow of the electrophoretic fluid between adjacent microcups during the subsequent sealing process would have no effect on the optical or electrical performance of the display. In addition, the processes involve lower costs and less processing steps than the processes currently available for the manufacture of multi-color electrophoretic displays.

In fact, the present invention has overcome the major obstacles involved particularly in the use of inkjet printing in the manufacture of electrophoretic displays. In other words, the two-step process has enabled the use of inkjet printing in the roll-to-roll manufacture of multi-color electrophoretic displays.

DETAILED DESCRIPTION OF THE INVENTION

Definitions

Unless defined otherwise in this specification, all technical terms are used herein according to their conventional definitions as they are commonly used and understood by those of ordinary skill in the art.

The term "microcup" refers to the cup-like display cells as described in the co-pending application, U.S. Ser. No. 09/518,488 filed on Mar. 3, 2000 and U.S. Pat. No. 6,788,449. For ease of illustration, the term "microcup" is used in the description of the processes; however, it is understood that the usefulness of the processes of the present invention is not limited to the microcup technology. The processes may be applied to other technologies for the manufacture of electrophoretic displays. Therefore the term "microcup" broadly encompasses display cells of all types. The term "display cells", in the present application, is broadly defined as cavities to which materials such as colorant solutions or dispersions, additive solutions or dispersions or electrophoretic fluids are filled.

The term "pattern-wise" is used to describe a process step which is carried out in a pre-selected area.

The term "non-pattern-wise" is used to describe a process step which is not carried out in a pre-selected area. Usually, a "non-pattern-wise" process step is carried out in a large area or an entire area.

I. Preparation of the Microcups

Figure 1:
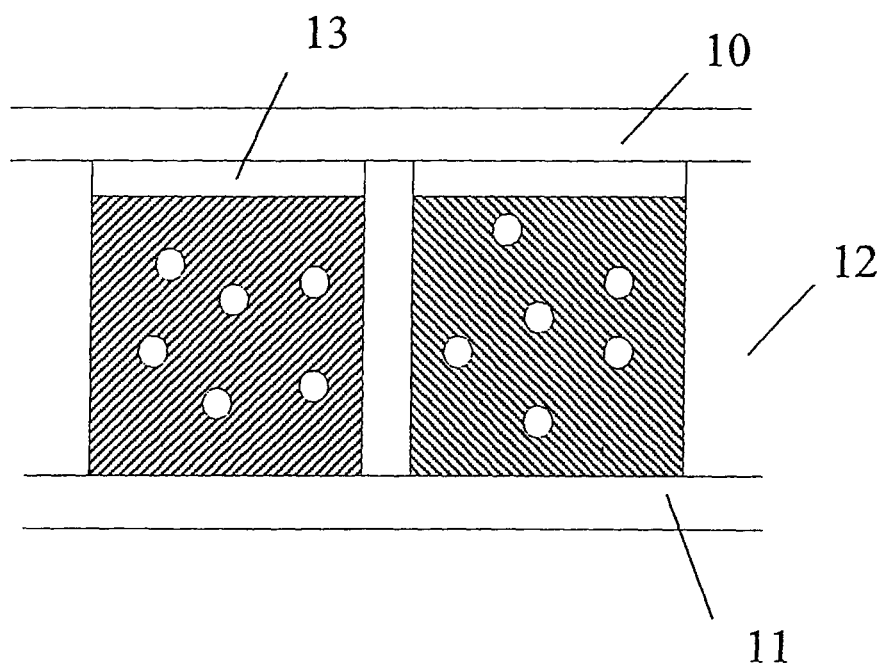
FIG. 1 is a schematic depiction of the electrophoretic display of the present invention.

A general depiction of a microcup-based electrophoretic display is shown in FIG. 1. The display comprises two electrode plates (10, 11), at least one of which is transparent (10), and a layer of microcups (12) enclosed between the two electrode plates. The microcups are filled with charged pigment particles dispersed in a dielectric solvent or solvent mixture and sealed with a polymeric sealing layer (13). When a voltage difference is imposed between the two electrode plates, the charged pigment particles migrate to one side or the other, causing either the color of the charged pigment particles or the color of the dielectric solvent or solvent mixture to be seen through the transparent electrode plate. One of the two electrode plates may be patterned.

The preparation of the microcup-based display cells may be accomplished by microembossing or imagewise exposure as disclosed in the co-pending application, U.S. Ser. No. 09/518,488 filed on Mar. 3, 2000 (corresponding to WO01/67170) or by a pre-punched hole process as disclosed in another application, U.S. Ser. No. 09/942,532 filed on Aug. 29, 2001 (corresponding to WO03/019280), now U.S. Pat. No. 6,788,449, the contents of both of which are incorporated herein by reference in their entirety.

II. Preparation of the Suspension/Dispersion The microcups are filled with an electrophoretic fluid comprising charged pigment particles dispersed in a dielectric solvent or solvent mixture. The dispersion may be prepared according to methods well known in the art such as U.S. Pat. Nos. 6,017,584, 5,914,806, 5,573,711, 5,403,518, 5,380,362, 4,680,103, 4,285,801, 4,093,534, 4,071,430, 3,668,106 and *IEEE Trans. Electron Devices,* ED-24, 827 (1977), and *J. Appl. Phys.* 49 (9), 4820 (1978). The charged pigment particles visually contrast with the medium in which the pigment particles are dispersed. The medium is a dielectric solvent or solvent mixture which preferably has a low viscosity and a dielectric constant in the range of about 2 to about 30, preferably about 2 to about 15, for high particle mobility. Examples of suitable dielectric solvents include hydrocarbons such as decahydronaphthalene (DECALIN), 5-ethylidene-2-norbornene, fatty oils, paraffin oil, aromatic hydrocarbons such as toluene, xylene, phenylxylylethane, dodecylbenzene or alkylnaphthalene, halogenated solvents such as perfluorodecalin, perfluorotoluene, perfluoroxylene, dichlorobenzotrifluoride, 3,4,5-trichlorobenzotrifluoride, chloropentafluoro-benzene, dichlorononane or pentachlorobenzene or perfluorinated solvents such as FC-43, FC-70 or FC-5060 from 3M Company, St. Paul Minn., low molecular weight halogen containing polymers such as poly(perfluoropropylene oxide) from TCI America, Portland, Oreg., poly(chlorotrifluoroethylene) such as Halocarbon Oils from Halocarbon Product Corp., River Edge, N.J., perfluoropolyalkylether such as Galden from Ausimont or Krytox Oils and Greases K-Fluid Series from DuPont, Del. In one preferred embodiment, poly(chlorotrifluoroethylene) is used as the dielectric solvent. In another preferred embodiment, poly(perfluoropropylene oxide) is used as the dielectric solvent.

The suspending medium may be colored by colorants (i.e., dyes or pigments). Nonionic azo and anthraquinone dyes are particularly useful. Examples of useful dyes may include, but are not limited to, Oil Red EGN, Sudan Red, Sudan Blue, Oil Blue, Macrolex Blue, Solvent Blue 35, Pylam Spirit Black and Fast Spirit Black from Pylam Products Co., Arizona, Sudan Black B from Aldrich, Thermoplastic Black X-70 from BASF, anthroquinone blue, anthroquinone yellow 114, anthroquinone red 111, 135, anthroquinone green 28 from Aldrich. Fluorinated colorants such as those disclosed in U.S. Publication Nos. 2004-0030125 and 2005-0039274, the contents of both publications are incorporated herein by reference in their entirety, are particularly useful when a perfluorinted solvent is used as the dielectric solvent.

In case of an insoluble dye or pigment, the dye or pigment for generating the color of the medium may also be dispersed in the dielectric medium. These dyes or pigments are preferably uncharged. If the dyes or pigments for generating color of the medium are charged, they preferably carry a charge which is opposite from that of the charged pigment particles. If the dyes or pigments carry the same charge as the charged pigment particles, then they should have different charge density or different electrophoretic mobility. In any case, the dyes or pigments for generating color of the medium must be chemically stable and compatible with other components in the dispersion.

The charged pigment particles may be of an organic or inorganic dye or pigment, such as $TiO_2$, phthalocyanine blue, phthalocyanine green, diarylide yellow, diarylide AAOT yellow, and quinacridone, azo, rhodamine, perylene pigment series from Sun Chemical, Hansa yellow G particles from Kanto Chemical, and Carbon Lampblack from Fisher. Submicron particle size is preferred. The particles should have acceptable optical characteristics, should not be swollen or softened by the dielectric solvent and should be chemically stable. The resulting suspension must also be stable against sedimentation, creaming or flocculation under normal operating conditions.

The pigment particles may exhibit a native charge, or may be charged explicitly using a charge control agent, or may acquire a charge when suspended in the dielectric solvent. Suitable charge control agents are well known in the art; they may be polymeric or non-polymeric in nature, and may also be ionic or non-ionic, including ionic surfactants such as Aerosol OT, sodium dodecylbenzenesulfonate, metal soap, polybutene succinimide, maleic anhydride copolymers, vinylpyridine copolymers, vinylpyrrolidone copolymer (such as Ganex from International Specialty Products), (meth)acrylic acid copolymers, N,N-dimethylaminoethyl (meth)acrylate copolymers. Fluorosurfactants are particularly useful as charge controlling agents in perfluorocarbon solvents. These include FC fluorosurfactants such as FC-170C, FC-171, FC-176, FC430, FC431 and FC-740 from 3M Company and Zonyl fluorosurfactants such as Zonyl FSA, FSE, FSN, FSN-100, FSO, FSO-100, FSD and UR from Dupont. Charge control agents and surfactants or dispersants are disclosed in U.S. Pat. Nos. 7,110,162; 7,052,766; 7,286,279; 7,226,550; 7,141,688; and 7,277,218; and U.S. Publication No. 2005-0136347; the contents of all of which are incorporated herein by reference in their entirety, are particularly useful when a fluorinated solvent is used as the dielectric solvent.

Suitable charged pigment dispersions may be manufactured by any of the well-known methods including grinding, milling, attriting, microfluidizing, and ultrasonic techniques. For example, pigment particles in the form of a fine powder are added to the suspending solvent and the resulting mixture is ball milled or attrited for several hours to break up the highly agglomerated dry pigment powder into primary particles. Although less preferred, a dye or pigment for generating color of the suspending medium may be added to the suspension during the ball milling process.

Sedimentation or creaming of the pigment particles may be eliminated by microencapsulating the particles with suitable polymers to match the specific gravity to that of the dielectric solvent. Microencapsulation of the pigment particles may be accomplished chemically or physically. Typical microencapsulation processes include interfacial polymerization, in-situ polymerization, phase separation, coacervation, electrostatic coating, spray drying, fluidized bed coating and solvent evaporation.

For a black/white electrophoretic display, the suspension comprises charged white particles of titanium oxide ($TiO_2$) dispersed in a black solvent or charged black particles dispersed in a dielectric solvent. A black dye or dye mixture such as Pylam Spirit Black and Fast Spirit Black from Pylam Products Co. Arizona, Sudan Black B from Aldrich, Thermoplastic Black X-70 from BASF, or an insoluble black pigment such as carbon black may be used to generate the black color of the solvent. For other colored suspensions, there are many possibilities. For a subtractive color system, the charged $TiO_2$ particles may be suspended in a dielectric solvent of a cyan, yellow or magenta color. The cyan, yellow or magenta color may be generated via the use of a dye or pigment. For an additive color system, the charged $TiO_2$ particles may be suspended in a dielectric solvent of a red, green or blue color generated also via the use of a dye or pigment. The red, green, blue color system is preferred for most applications.

III. Sealing of the Filled Microcups

The sealing of the microcups may be accomplished in a number of ways. One of the approaches is to disperse a UV curable composition into an electrophoretic fluid containing charged pigment particles dispersed in a dielectric solvent or solvent mixture. The UV curable composition is immiscible with the dielectric solvent or solvent mixture and has a specific gravity preferably no greater than that of the dielectric solvent and the charged pigment particles. The two components, the UV curable composition and the electrophoretic fluid, are thoroughly blended, for example, in an in-line mixer, and immediately coated into the microcups with a precision coating mechanism such as Myrad bar, gravure, doctor blade, slot coating or slit coating. Excess fluid is scraped away by a wiper blade or a similar device. A small amount of a weak solvent or solvent mixture such as isopropanol, methanol or an aqueous solution thereof may be used to clean the residual electrophoretic fluid on the top surface of the partition walls of the microcups. Volatile organic solvents may be used to control the viscosity and coverage of the electrophoretic fluid. The thus-filled microcups are then dried and the UV curable composition floats to the top of the electrophoretic fluid. The microcups may be sealed by curing the supernatant UV curable layer during or after it floats to the top. UV or other forms of radiation such as visible light, IR and electron beam may be used to cure and seal the microcups. Alternatively, heat or moisture may also be employed to cure and seal the microcups, if appropriate heat or moisture curable compositions are used. The sealing process referred to in this paragraph is the one-step sealing process.

The radiation curable composition for sealing may comprise a material selected from the group consisting of polyvalent acrylate or methacrylate, cyanoacrylates, polyvalent vinyl including vinylbenzene, vinylsilane and vinylether, polyvalent epoxide, polyvalent isocyanate, polyvalent allyl, and oligomers or polymers containing crosslinkable functional groups.

Thermoplastic elastomers may also be used as the sealing material. Examples of useful thermoplastic elastomers may include di-block, tri-block or multi-block copolymers represented by the formulas ABA or (AB)n in which A is styrene, a-methylstyrene, ethylene, propylene or norbonene; B is butadiene, isoprene, ethylene, propylene, butylene, dimethoylsiloxane or propylene sulfide; and A and B cannot be the same in the formula. The number, n, is ≥1, preferably 1-10. Representative copolymers may include poly(styrene-b-butadiene), poly(styrene-b-butadiene-b-styrene), poly(styrene-b-isoprene-b-styrene), poly(styrene-b-ethylene/butylene-b-styrene), poly(styrene-b-dimethylsiloxane-b-styrene), poly((α-methylstyrene-b-isoprene), poly(α-methylstyrene-b-isoprene-b-α-methylstyrene), poly(α-methylstyrene-b-propylene sulfide-b-α-methylstyrene), and poly(α-methylstyrene-b-dimethylsiloxane-b-α-methylstyrene). Additives, such as silica particles and surfactants, may be used to improve the film integrity and coating quality.

A preferred group of dielectric solvents exhibiting desirable density and solubility discrimination against acrylate monomers and oligomers are halogenated hydrocarbons and derivatives thereof. Surfactants may be used to improve the adhesion and wetting at the interface between the electrophoretic fluid and the sealing material. Useful surfactants include the FC surfactants from 3M Company, Zonyl fluorosurfactants from DuPont, fluoroacrylates, fluoromethacrylates, fluoro-substituted long chain alcohols, perfluoro-substituted long chain carboxylic acids and derivatives thereof.

Alternatively, the electrophoretic fluid and the sealing composition may be coated sequentially into the microcups, if the sealing composition is at least partially compatible with the dielectric solvent. Thus, the sealing of the microcups may be accomplished by overcoating a thin layer of the sealing composition (which is curable by radiation, heat, moisture or interfacial reaction) on the surface of the electrophoretic fluid. Interfacial polymerization followed by UV curing is very beneficial to the sealing process. Intermixing between the electrophoretic fluid and the overcoat is significantly suppressed by the formation of a thin barrier layer at the interface by interfacial polymerization. The sealing is then completed by a post curing step, preferably by UV radiation. To further reduce the degree of intermixing, it is highly desirable that the specific gravity of the overcoating is no greater than that of the electrophoretic fluid. Volatile organic solvents may be used to adjust the viscosity and the thickness of the coating. When a volatile solvent is used in the overcoat, it is preferably immiscible with the dielectric solvent. The two-step sealing process as described is particularly useful when the dye or pigment used is at least partially soluble in the sealing composition.

IV. Preparation of Multi-color Electrophoretic Displays

The process is carried out in multiple steps as illustrated in FIGS. 2a-2e. The process involves filling colorant solutions or dispersions of different colors and charged pigment particles in two separate steps. More specifically, the process consists of at least two steps, (i) pattern-wise filling microcups with colorant solutions or dispersions and, if necessary, evaporating the carrier solvent in the colorant solutions or dispersions when it is different from the dielectric solvent or solvent mixture in the electrophoretic fluid, and (ii) pattern-wise or non-pattern-wise filling an electrophoretic fluid comprising charged pigment particles dispersed in a dielectric solvent or solvent mixture into the microcups. In one embodiment, step (i) is carried out before step (ii). In another embodiment, step (ii) is carried out before step (i). However, it is preferred that step (i) is carried out before step (ii).

The pattern-wise filling of the colorant solutions or dispersions may be accomplished in a number of ways. For example, precision displacement technologies, such as inkjet printing and organic vapor phase deposition may be used. The colorant solutions or dispersions of different colors may also be directly printed into the microcups. Suitable printing methods may include, but are not limited to, flexo printing, lithographic printing, driographic or waterless lithographic printing, gravure printing, screen printing, thermal printing, laser ablative transfer printing, strip coating and the like. If inkjet printing is used, Inkjet printer heads with multiple nozzles may be used to simultaneously or sequentially deliver colorant solutions or dispersions of different colors into microcups in predetermined areas.

Figure 2A:
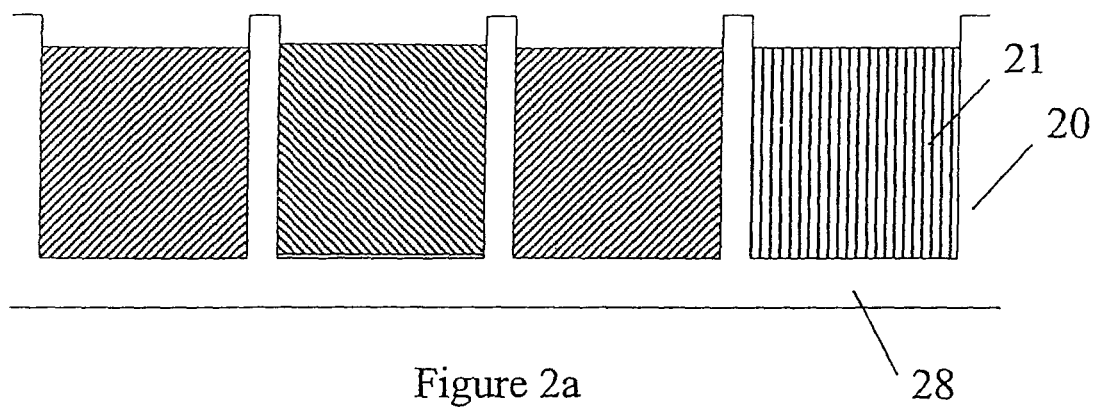
FIGS. 2a-2e illustrate a process for manufacturing a multi-color electrophoretic display.

As shown in FIG. 2a, colorant solutions or dispersions (21) are filled into microcups (20) in different areas. The areas are predetermined. For example, in a certain area, the microcups may be filled with a colorant solution or dispersion of one color and, in another area, the microcups may be filled with a colorant solution or dispersion of another color.

The microcups may be formed on an electrode plate (28) and there may be a primer layer (not shown) between the electrode plate and the microcups.

The pattern-wise filling of the colorant solutions or dispersions may be accomplished in a number of ways. For example, the colorant solutions or dispersions of different colors may be directly filled into the microcups in different areas.

Alternatively, the pattern-wise filling of the colorant solutions or dispersions of different colors into the microcups may be carried out by a method similar to that as disclosed in the co-pending application, U.S. Ser. No. 09/518,488 filed on Mar. 3, 2000. For example, the method may include laminating or coating all microcups with a positively working photoresist, followed by imagewise exposing the positively working photoresist to open the microcups in a predetermined area and then filling the opened microcups with a colorant solution or dispersion of a first color, for example, by inkjet printing. These steps may be repeated to fill microcups with colorant solutions or dispersions of different colors in different areas. All of the filled microcups in this case may be top-sealed in one run by the one-step or the two-step sealing process as described in Section III.

Another method for filling the microcups with colorant solutions or dispersions of different colors is similar to the one disclosed in U.S. Pat. Nos. 6,972,893 and 6,545,797, the contents of both of which are incorporated herein by reference in their entirety. Briefly, the method may involve first filling all microcups with a filler material, overcoating the filled microcups with a positively working photoresist, opening the closed microcups in a predetermined area and removing the filler material from the opened microcups and then filling the opened microcups with a colorant solution or dispersion of a first color. These steps may be repeated to fill the microcups in different areas with colorant solutions or dispersions of different colors. All of the filled microcups in this case may be top-sealed in one run by the one-step or two-step sealing process as described in Section III.

The colorant solution or dispersion is prepared by dissolving or dispersing a dye or pigment in a carrier solvent.

In one embodiment, the carrier solvent may be a dielectric solvent or solvent mixture as described in Section II above. In this case, the colorants must be soluble or dispersible in the dielectric solvent or solvent mixture. The dielectric solvent or solvent mixture may be the same as, or different from, the dielectric solvent or solvent mixture in the electrophoretic fluid.

In another embodiment, the carrier solvent may be a common solvent or solvent mixture, especially a common organic solvent or solvent mixture. Suitable common organic solvents may include, but are not limited to, hydrocarbons (fluorinated or non-fluorinated), alkyl ketones, alkyl esters, alcohols, ethers, water and mixtures thereof. If a common organic solvent is used as the carrier solvent, the colorant is still preferably soluble or dispersible in the dielectric solvent or solvent mixture in the electrophoretic fluid.

If inkjet printing is used, the colorant solutions or dispersions, according to the present invention, preferably have a surface tension in the range of about 14 to about 50 dyne/cm, more preferably in the range of about 16 to about 45 dyne/cm.

The carrier solvent used for the colorant solutions or dispersions is preferably volatile so that it may be removed easily. The carrier solvent may also be dried off.

The dyes or pigments in the colorant solutions or dispersions may be of any color and preferably is thermally and photochemically stable. The dyes or pigments are preferably soluble in the carrier solvent.

For inkjet printing, if not totally soluble, the particle size of the dye or pigment in the carrier solvent is preferably less than 1 um, more preferably less than 0.1 um.

A surfactant or dispersant may be used to stabilize the dye or pigment in the carrier solvent. A viscosity modifier may also be used to fine tune the rheology of the colorant solutions or dispersions. The surfactant, dispersant or viscosity modifier, if used in the colorant solutions or dispersions, should not interfere with the electrophoretic properties of the final electrophoretic fluid. A fugitive surfactant or dispersant, such as a Surfynol® surfactant (from Air Product), is particularly useful if the surfactant or dispersant used in the colorant solutions or dispersions has a detrimental effect on the electrophoretic characteristics.

In one embodiment, the colorant solutions or dispersions may be of different colors. In another embodiment, the colorant solutions or dispersions may have the same dye or pigment, but with different optical densities or concentrations, so as to allow different shades of the same color. Therefore the term "different colors", in the context of the present application, would also include "different shades of the same color". The colorant solution or dispersion may also be a solution or dispersion which is colorless.

Figure 2B:
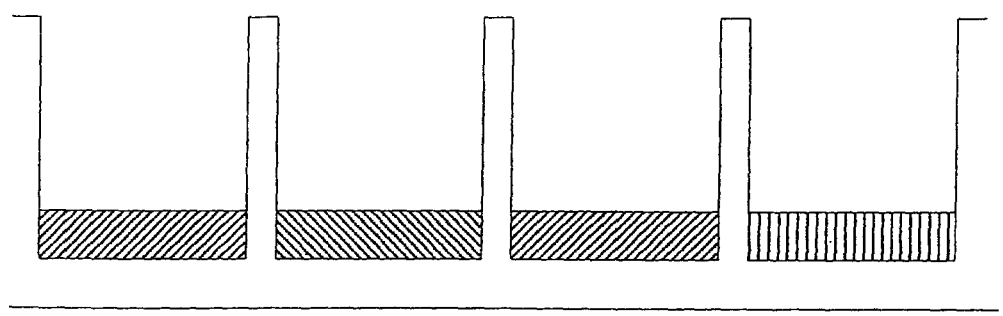

While it is not essential, it is preferred that the carrier solvent in the colorant solutions or dispersions is removed after the colorant solutions or dispersions have been filled into the microcups but before the charged pigment particles are introduced. The removal of the carrier solvent may be accomplished by, for example, heat or air flow. FIG. 2b shows that only dried dyes or pigments remain in the microcups.

Figure 2C:
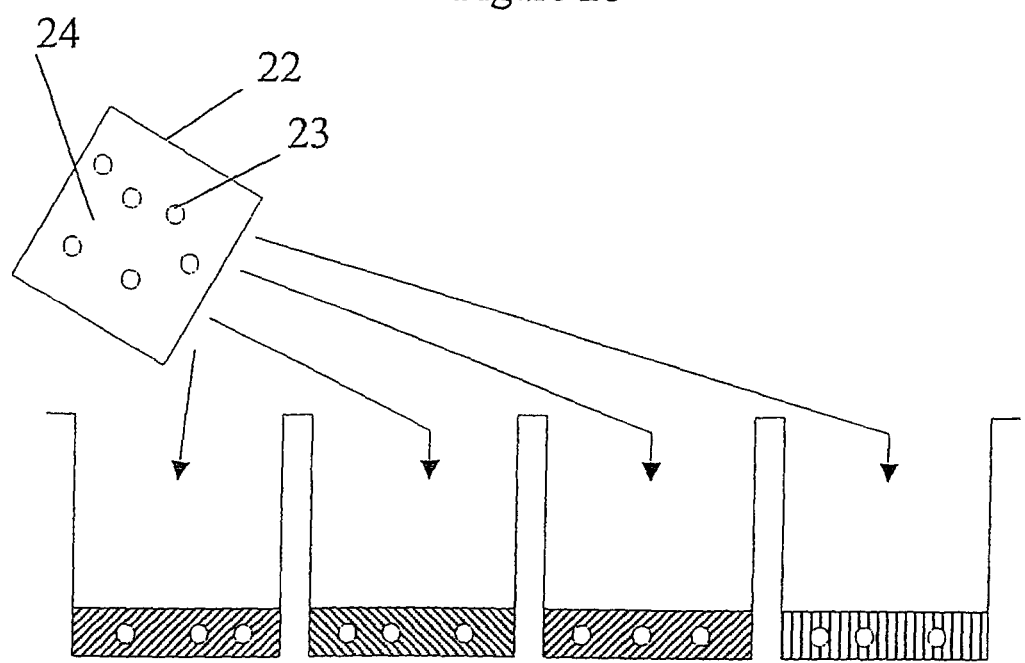
Figure 2D:
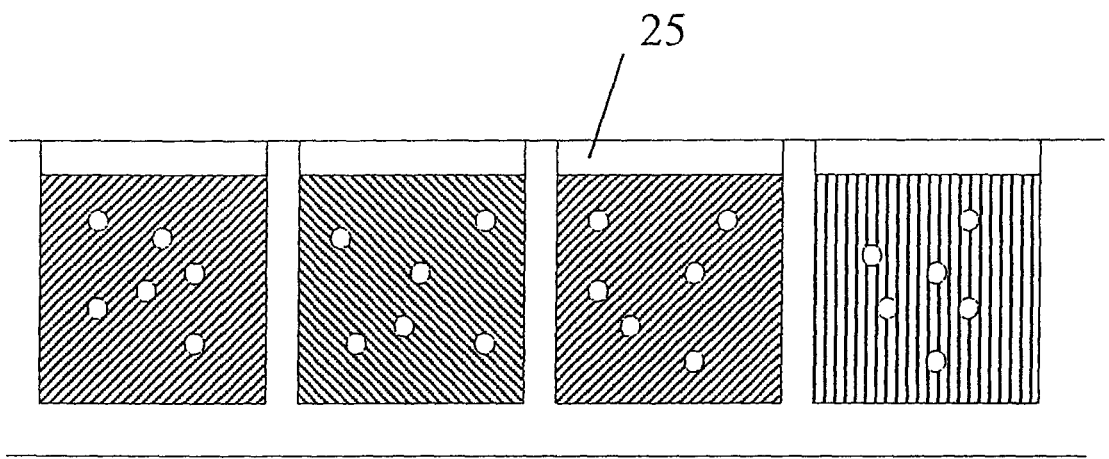
Figure 2E:
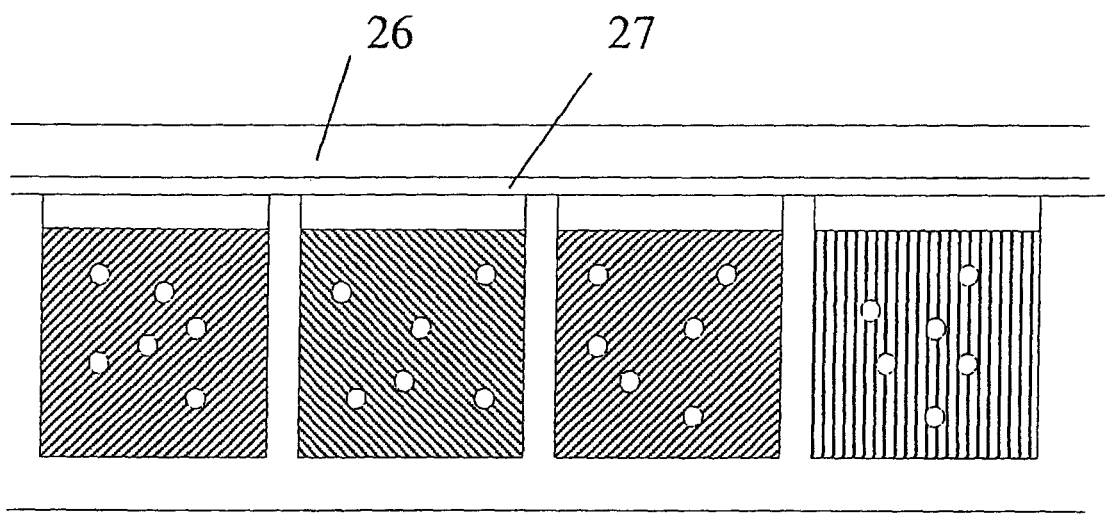

The introduction of the charged pigment (such as $TiO_2$ or $TiO_2$-containing) particles is accomplished by non-pattern-wise filling an electrophoretic fluid (22) comprising charged pigment particles (23) dispersed in a dielectric solvent or solvent mixture (24) into microcups which are already filled with the colorants, as shown in FIG. 2c.

The filling of the electrophoretic fluid may also be done pattern-wise by methods described in copending patent applications, Ser. No. 09/518,488 filed Mar. 3, 2000 and U.S. Pat. No. 6,545,797, the contents of both of which are incorporated herein by reference in their entirety.

The charged pigment particles may be of the same color and the dielectric solvent or solvent mixture is preferably clear and colorless. The charged pigment particles may also be of different colors. All microcups may be filled with an electrophoretic fluid of the same composition.

In the present invention, the concentration of the charged pigment particles in the dielectric solvent or solvent mixture is preferably in the range of about 0.1% to about 70% by weight.

Preferred dielectric solvents may include, but are not limited to, those described in Section II. The removal of the carrier solvent in the colorant solutions or dispersions before introducing the electrophoretic fluid is preferred and even necessary if the carrier solvent may interfere with the subsequent top-sealing process.

The top-sealing of the filled microcups may be accomplished by methods as described in Section III above. For example, the sealing may be accomplished by adding a sealing composition into the electrophoretic fluid before filling the electrophoretic fluid into the microcups which have been pre-filled with colorants. The filled microcups are then sealed by curing the supernatant sealing layer (25) during or after it floats to the top of the electrophoretic fluid (i.e., hardened in situ). Heat or radiation such as UV, visible light, IR and electron beam may be used to cure the sealing composition to seal the filled microcups. Alternatively, the sealing may be accomplished by overcoating a sealing composition onto the electrophoretic fluid after the electrophoretic fluid has been filled in and the sealing layer (25) may be formed also by hardening of the sealing composition by radiation, heat, moisture or interfacial reaction (i.e., hardened in situ). The sealing composition used in these methods preferably has a specific gravity no greater than that of the electrophoretic fluid and preferably is immiscible with the electrophoretic fluid. In the present process, all of the filled microcups may be sealed in one run (FIG. 2d) even though the microcups eventually are filled with electrophoretic fluids of different colors.

If step (ii) is carried out before step (i), the sealing is then carried out with, or after, filling of the colorant solutions or dispersions. In this case, the sealing composition preferably has a specific gravity no greater than that of the colorant solutions or dispersion. The sealing composition is also preferably immiscible with the colorant solutions or dispersions.

After the microcups are filled and top-sealed, the sealed microcups may be laminated with an electrode plate (26), optionally pre-coated with an adhesive layer (27). The adhesive may be a pressure sensitive adhesive, a hot melt adhesive, a heat, moisture or radiation curable adhesive.

V. Preparation of Electrophoretic Displays Comprising Microcups Filled with Electrophoretic Fluids of Different Characteristics Electrophoretic displays comprising microcups filled with electrophoretic fluids of different electrophoretic characteristics, such as switching rate, threshold voltage, gamma and/or clearing voltage, may be manufactured by (i) first pattern-wise filling microcups, for example, by inkjet printing, with additive solutions or dispersions providing the various characteristics, followed by (ii) pattern-wise or non-pattern-wise adding an electrophoretic fluid comprising charged pigment (e.g., $TiO_2$ or other white or colored pigments) particles dispersed in a dielectric solvent or solvent mixture into the microcups. The two steps, (i) and (ii), may be carried out in a reversed order.

The microcups may be formed on an electrode plate and there may be a primer layer between the electrode plate and the microcups. The pattern-wise filling of the additive solutions or dispersions, for example, by inkjet printing, may be carried out by any of the methods described in Section IV above for the pattern-wise filling of the colorant solutions or dispersions.

The additive solution or dispersion is prepared by dissolving or dispersing an additive in a carrier solvent. If inkjet printing is used, the carrier solvent should be compatible with the inkjet process and the printer head used. Useful additives for the present invention may include, but are not limited to, surfactants, protective colloids, polymers, viscosity modifiers, charge controlling agents, stabilizers, antioxidants, fluorescent materials, fillers and filler particles.

Examples of useful additives may include, but are not limited to, those disclosed in U.S. Pat. Nos. 7,110,162; 7,052,766; 7,286,279; 7,226,550; 7,141,688; and 7,277,218; and U.S. Publication No. 2005-0136347; the contents of all of which are incorporated herein by reference in their entirety.

In one embodiment, the carrier solvent may be a dielectric solvent or solvent mixture as described in Section II above. In this case, the additive must be soluble or dispersible in the dielectric solvent or solvent mixture, or adsorbed onto at least one of the charged pigment particles. The carrier solvent may be the same as, or different from, the dielectric solvent or solvent mixture in the electrophoretic fluid to be filled later.

In another embodiment, the carrier solvent may be a common solvent or solvent mixture, especially a common organic solvent or solvent mixture. Suitable common organic solvents or solvent mixtures may include, but are not limited to, hydrocarbons, alkyl ketones, alkyl esters, alcohols, ethers, water and mixtures thereof. If a common organic solvent is used, the additive is still preferably soluble or dispersible in the dielectric solvent or solvent mixture in the electrophoretic fluid to be filled later.

The additive solution or dispersion preferably has a surface tension in the range of about 14 to about 50 dyne/cm, more preferably in the range of about 16 to about 45 dyne/cm. The carrier solvent is also preferably volatile so that it may be removed easily.

The additive preferably is thermally and photochemically stable and is preferably soluble in the carrier solvent. If not totally soluble, the particle size of the additive in the carrier solvent is preferably less than 1 um, more preferably less than 0.1 um. The concentrations of the additive in the additive solution or dispersion may be adjusted, depending on the specific needs.

A surfactant or dispersant may be used to stabilize the additive particles in the carrier solvent. A viscosity modifier may also be used to fine tune the rheology of the additive solution or dispersion. The surfactant, dispersant or viscosity modifier, if used, should not interfere with the electrophoretic properties of the final electrophoretic fluid. A fugitive surfactant or dispersant, such as Surfynol® surfactant (from Air Product), is particularly useful if the surfactant or dispersant used in the additive solution or dispersion has a detrimental effect on the electrophoretic characteristics.

Optionally, the carrier solvent of the additive solutions or dispersions may be dried off before the subsequent step of filling the electrophoretic fluid.

The introduction of the electrophoretic fluid is accomplished by pattern-wise or non-pattern-wise filling as described in Section IV above. In this case, the electrophoretic fluid may be colored.

The thus filled microcups are then top-sealed by one of the sealing processes described in the present application (e.g., Section III and Section IV). If step (ii) is carried out before step (i), the sealing is then carried out with, or after, filling of the additive solutions or dispersions. In this case, the sealing composition has a specific gravity preferably no greater than that of the additive solutions or dispersion. The sealing composition is also preferably immiscible with the additive solutions or dispersions.

After the microcups are filled and top-sealed, the sealed microcups may be laminated with an electrode plate, optionally pre-coated with an adhesive layer. The adhesive may be a pressure sensitive adhesive, a hot melt adhesive, a heat, moisture or radiation curable adhesive.

VI. Preparation of Sectional Electrophoretic Displays

In a sectional electrophoretic display, the display panel of an electrophoretic display may be divided into sections and each section has a color system of two or more colors, preferably a two-color system. For example, a first section of the display panel has a red/white color combination, a second section has a blue/white color system and a third section has a green/white color system.

The sections may be of any shapes or sizes. In one embodiment, the sections may be in the shape of stripes.

Figure 3:
FIG. 3 shows a price tag prepared from a sectional electrophoretic display.

This type of sectional displays is particularly useful for large electronic signs and boards. FIG. 3 shows a price tag prepared from such a sectional display. In area 3a, the text and the background may have a red/white color combination whereas in area 3b, the text and the background may have a blue/white color combination.

The sectional filling may be carried out in two steps as described in Section IV above. In other words, colorant solutions or dispersions of different colors and charged pigment particles are filled into the microcups in two separate steps, as described in Section IV above. However, because of the display being a sectional display, the filling does not have to involve masking and selective opening of the microcups. Instead, the colorant solution or dispersion of one color may be filled in an entire section.

For the sectional filling, alternative high through-put methods such as coating and ultrasonic spraying may also be used to speed up the manufacturing process for manufacturing large signs and boards at low cost.

An electrophoretic display having sections of different electrophoretic characteristics may also be similarly prepared according to the process of Section V above.

The thickness of the display produced by the present processes as described can be as thin as a piece of paper. The width of the display is the width of the coating web (typically 3-90 inches). The length of the display can be anywhere from inches to thousands of feet depending on the size of the roll.

While the present invention has been described with reference to the specific embodiments thereof, it should be understood by those skilled in the art, that various changes may be made and equivalents may be substituted without departing from the true spirit and scope of the invention. In addition, many modifications may be made to adapt a particular situation, materials, compositions, processes, process step or steps, to the objective, spirit and scope of the present invention. All such modifications are intended to be within the scope of the claims appended hereto.

What is claimed is:

1. A process for manufacturing an electrophoretic display, comprising the following steps in sequence:
   (i) pattern-wise filling microcups by ink jet printing with colorant solutions or dispersions of different colors, each of said colorant solutions or dispersions comprising a carrier solvent,
   (ii) removing said carrier solvent in said colorant solutions or dispersions,
   (iii) non-pattern-wise filling the microcups with an electrophoretic fluid comprising charged pigment particles dispersed in a dielectric solvent or solvent mixture.

2. The process of claim 1, wherein said inkjet printing is carried out with a printer head comprising multiple nozzles.

3. The process of claim 1, wherein said colorant solution or dispersion comprises a dye or pigment.

4. The process of claim 1 wherein said colorant solution or dispersion is colorless.

5. The process of claim 1, wherein said colorant solution or dispersion further comprises a surfactant, dispersant or viscosity modifier.

6. The process of claim 1, wherein said carrier solvent is a dielectric solvent or solvent mixture.

7. The process of claim 1, wherein said carrier solvent is a common solvent or solvent mixture.

8. The process of claim 7, wherein said common solvent or solvent mixture is selected from the group consisting of hydrocarbons, alkyl ketones, alkyl esters, alcohols, ethers, water and mixtures thereof.

9. The process of claim 1, wherein said electrophoretic fluid comprises charged pigment particles of the same color in a dielectric solvent or solvent mixture.

10. The process of claim 1, wherein said electrophoretic fluid comprises charged pigment particles of different colors in a dielectric solvent or solvent mixture.

11. The process of claim 1, further comprising top-sealing of the filled microcups with a sealing composition having a specific gravity no greater than that of the electrophoretic fluid.

12. The process of claim 1, further comprising top-sealing of the filled microcups with a sealing composition which is hardened in situ.

13. The process of claim 1, wherein said step (i) of filling is carried out in sections and each of said sections has a color system of two or more colors.

14. The process of claim 13, wherein said color system has two colors.

15. The process of claim 1, wherein said carrier solvent is dried off in step (ii).

16. The process of claim 1, wherein the colorants are soluble or dispersible in the dielectric solvent or solvent mixture.

* * * * *